[54] AUTOMATIC COMBINATION CHECK VALVE

[76] Inventor: William T. Houston, 2639 Flory Drive, San Jose, Calif. 95121

[22] Filed: June 11, 1975

[21] Appl. No.: 585,885

Related U.S. Application Data
[63] Continuation of Ser. No. 428,335, Dec. 26, 1973.

[52] U.S. Cl. .............. 137/460; 137/486; 137/519.5
[51] Int. Cl.² .......................................... F16K 17/00
[58] Field of Search ........ 137/519.5, 498, 487, 486, 137/460, 459

[56] References Cited
UNITED STATES PATENTS

| | | | |
|---|---|---|---|
| 2,461,830 | 2/1949 | Mahon | 137/486 |
| 2,615,676 | 10/1952 | Neubauer | 137/519.5 |
| 3,055,391 | 9/1962 | Shuk | 137/519.5 X |

*Primary Examiner*—Harold W. Weakley
*Attorney, Agent, or Firm*—Bauer, Amer & King

[57] ABSTRACT

A safety valve for pressurized fluid or the like includes a housing having first and second chambers and a valve seat formed in the first chamber. Inlet and outlet conduits are in fluid flow communication with the first chamber with the inlet conduit being remote from the valve seat and the outlet conduit being adjacent the valve seat. A first valve, for example a ball, is contained loosely within the first chamber and is arranged to engage the valve seat when there is a sudden pressure drop in the outlet conduit. A slide is contained within the second chamber and is provided with first and second opposed end faces and an opening therethrough which, in one position of the slide, permits fluid flow communication between the inlet conduit and the first chamber. In an alternate position of the slide fluid flow between the inlet conduit and the first chamber is prevented. First and second bypass means, for example passageways formed in the housing, are in fluid flow communication with the two opposed ends of the slide. The first passageway permits fluid flow from the inlet conduit to the second chamber and against the first end face of the slide. The second passageway provides fluid communication between the outlet conduit and the second end face of the slide. When there is a sudden pressure drop in the outlet conduit the ball in the first chamber will be forced against the valve seat thereby preventing any substantial fluid flow therethrough. The first passageway will then conduct the pressurized fluid from the inlet conduit to the first end face of the slide in order to displace the slide to its second position that blocks the flow of fluid through the housing. The slide can be returned to its initial position that permits the flow of fluid through the housing only by the application of an external force to the second end face thereof.

1 Claim, 3 Drawing Figures

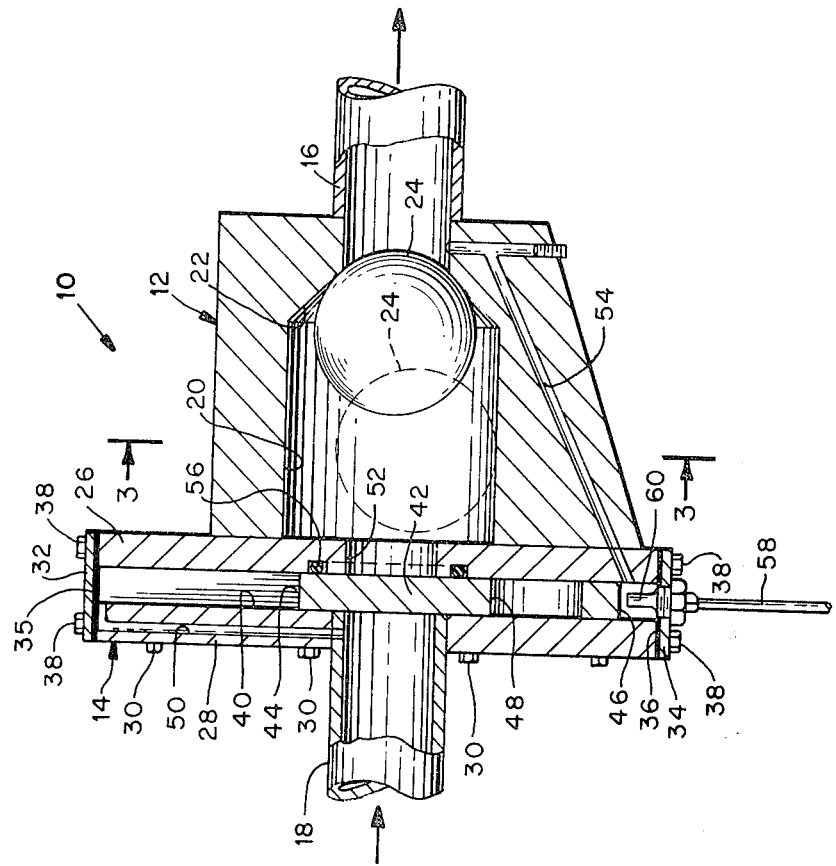
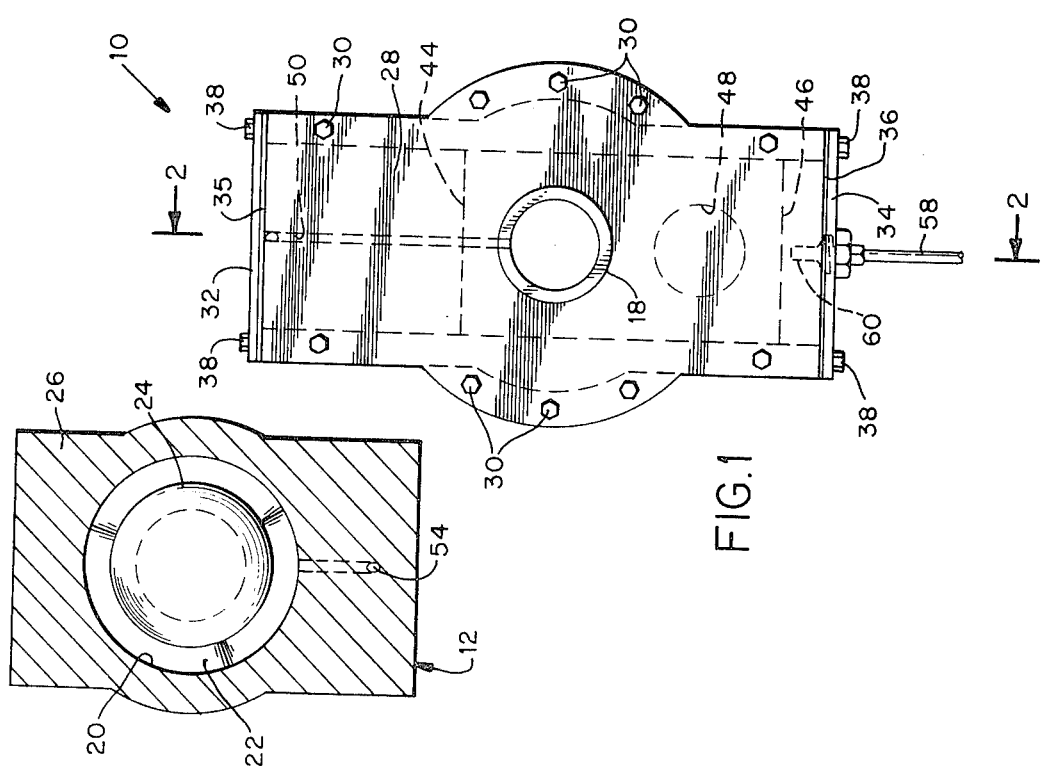

AUTOMATIC COMBINATION CHECK VALVE

This is a continuation, of application Ser. No. 428,335 filed Dec. 26, 1973.

The aforementioned abstract is neither intended to define the invention of the application which, of course, is measured by the Claims, nor is it intended to be limiting as to the scope of the invention in any way.

BACKGROUND OF THE INVENTION

1. Field of the Invention

This invention relates generally to safety valves and more particularly to a safety valve that is automatically closable upon an inadvertent drop of pressure in a fluid line.

DESCRIPTION OF THE PRIOR ART

Sequentially operable valves are well known in the prior art. Generally these valves are used for safety purposes and operate to close a fluid line upon the occurrence of a predetermined condition. One example of such a valve is disclosed in U.S. Pat. No. 3,143,143 granted to J. W. Taylor et. al. on Aug. 4, 1964. The Taylor valve is particularly useful as safety means for use in high pressure lines, for example the flow line of high pressure oil and gas wells. The Taylor et. al. structure provides means for equalizing the pressure across the valve member before forcing the ball off its seat and back into an open position. Primarily, the Taylor et. al. patent provides structure that minimizes damage to the seating surface of the ball and to the valve seat.

Another prior art valve that is operated by a predetermined rate of pressure change of a fluid is disclosed in U.S. Pat. No. 3,476,133 granted on Nov. 4, 1969 to R. L. Stedfeld. The structure disclosed in the Stedfeld Patent provides a valve that is operable by a predetermined rate of pressure change and which is not effected by a gradual pressure change in the fluid. Two chambers in the Stedfeld structure are connected by a calibrated or metering passage so that only a predetermined rate of pressure change of the fluid is effective to operate the valve which is in the form of a piston or the like.

U.S. Pat. No. 3,096,784 granted on July 9, 1963 to S. A. G. Svensson discloses an automatic type shutoff valve that is intended for use with a pressure differential from the ambient pressure. The structure in the Svensson patent prevents the pressure difference from dropping below the predetermined valve and provides a cutoff device which operates automatically, does not take up much space and is reliable in that it is kept open at pressure differences exceeding the predetermined value while being unresponsive to pressure impulses from the medium which flows through the pipe under control and which has a lower pressure than the ambient pressure. The Svensson patent shuts off as soon as the pressure difference is below the predetermined value.

Still another prior art structure in this specific field is disclosed in U.S. Pat. No. 3,217,743 granted on Nov. 16, 1965 to G. Ambille. This last mentioned patent is intended to close off the chamber when a sudden overpressure occurs in the chamber. The valve in the Ambille patent comprises a body in which is formed a housing or a cavity having two openings that are coaxial with each other. Both openings are in communication with the cavity and with the exterior. In the cavity there is provided a plurality of balls each having a diameter which is greater than that of the openings. When an overpressure is present inside the chamber or cavity one of the balls moves into position so as to close off the opening which thereby provides a means of communication between the housing and the exterior. When there is no overpressure inside the chamber a stem can be inserted from the exterior by outwardly displacing the balls so that the stem passes through the openings and through the housing.

U.S. Pat. No. 2,322,658 granted on June 22, 1943 to J. W. Overbeke discloses still another prior art valve. The structure of the Overbeke patent provides a valve positioned at the intersection of two separate conduits that are joined to a single supply conduit. The valve includes a ball which in normal operation leaves both conduits open for the passage of fluid therethrough. The ball is displaced by the pressure differential resulting from a break in one conduit so that it becomes seated over the inlet to the broken conduit and thereby prevents the passage of fluid to the broken conduit while leaving the other conduit open.

SUMMARY OF THE INVENTION

In its broadest aspect the present invention provides a housing having a first elongated oversized chamber therein in which a ball is loosely positioned. Normally, with the valve in the open condition, the ball rests loosely on the bottom of the chamber so that inlet and outlet conduits that are coupled to the housing may pass fluid therethrough. Should a break occur in the outlet conduit downstream of the chamber, a pressure differential will occur forcing the ball into a valve seat formed in the downstream end of the chamber. A slide valve is positioned within a second chamber that normally permits fluid flow therethrough. However when there is a pressure drop as described above, a first passageway bypasses the fluid from the inlet conduit to the second chamber and against one end face of the slide valve moves the slide valve to a closed position. A second passageway extends from the outlet conduit to the opposite face of the slide valve. External means for applying a pressure to the second face of the slide valve may be used for returning the slide valve to the open position once the break in the outlet conduit has been repaired.

Accordingly it is an object of the present invention to provide an improved safety valve, as described above, that requires a minimum number of moving parts, which is inexpensive to fabricate and which is automatic in operation when there is a sudden pressure drop in an outlet conduit.

A further object of the present invention is to provide an automatic safety valve, as described above, that is responsive to pressure differentials for moving between the open and closed positions.

Still another object of the present invention is to provide a safety valve, as described above, that may be used with either liquid or gas and which moves automatically from the open to the closed position upon the occurrence of a break in the conduit downstream of the valve.

These and other objects, features and advantages of the invention will, in part, be pointed out with particularity, and will, in part, become obvious from the following more detailed description of the invention taken in conjunction with the accompanying drawing, which forms an integral part thereof.

BRIEF DESCRIPTION OF THE DRAWING

In the various figures of the drawing like reference characters designate like parts. In the drawing:

FIG. 1 is a plan view of the automatic safety valve comprising the present invention;

FIG. 2 is a sectional elevational view taken along line 2—2 of FIG. 1 with portions thereof shown in phantom outline representing alternate positions of the valve members; and FIG. 3 is a transverse sectional view taken along line 3—3 of FIG. 2.

DESCRIPTION OF THE PREFERRED EMBODIMENT

In referring now particularly to FIG. 1 and FIG. 2 there is shown an improved valve 10 comprising the present invention. The valve 10 includes a housing which, in the embodiment illustrated, comprises first and second sections 12 and 14. An outlet conduit 16 is secured to the first housing section 12 while an inlet conduit 18 is secured to the second housing section 14.

For purposes to be described hereinafter, the first housing section 12 is provided with a first, enlarged internal chamber 20 and a conical valve seat 22 at the downstream end thereof adjacent the outlet conduit 16. A ball 24 having a diameter substantially smaller than that of the chamber 20 is movable between the positions shown in solid and dotted outlines in FIG. 2.

The second housing section 14 is comprised of sidewalls 26 and 28 which are secured to each other by means of suitable fasteners such as bolts or screws 30. End plates 32 and 34, together with gaskets 35 and 36 are secured to the side plates 26 and 28 by means of suitable fasteners such as bolts or screws 38. The side plates 26 and 28 together with the end plates 32 and 34 define a second chamber 40 within the second housing section 14.

A slide, generally designated by the reference character 42 is contained within the chamber 40. The slide 42 is defined by first and second end faces 44 and 46 respectively, as well as an opening 48.

The second housing section 14 is further defined by a first passageway 50 that extends between and is in communication with the inlet conduit 18 and the second chamber 50. In addition the second housing 14 includes an opening 52 that provides fluid communication between the inlet conduit 18 and the first chamber 20 through the second chamber 40. The first housing 12 is also provided with a second passageway 54 that extends between and is in fluid communication with the outlet conduit 16 and the second chamber 40. It will be noted that the first passageway 50 provides fluid communication between the inlet conduit 18 and the upper end face 44 of the slide 42 while the second passageway 54 provides fluid communication between the outlet conduit 16 and the lower end face 46 of the slide 42. O-ring seals 56 are provided between the face of the slide 42 that is in opposition to the wall of the second housing 14 in which the opening 52 is formed.

As may be noted from the drawing the valve 10 of the present invention comprises only two moving parts. The ball 24 functions only as a means for creating a pressure differential as will be explained hereinafter. The slide 42 will remain in the closed position as shown in FIG. 2 until a force is applied to the lower end face 46. A tube 58 together with a fitting 60 may be used for the purpose of moving the slide from the closed position shown in solid outline in FIG. 2 to the open position shown in phantom outline in FIG. 2 wherein the openings 48 and 52 are coincidental with the axis of the inlet and outlet conduits 16 and 18, respectively, and the first chamber 20.

The present invention finds particular utility as means for preventing the unsightly and expensive loss of oil spills that result from breakage in a transmission pipe or, in the case of gas, the escape of a valuable commodity. Under normal flow conditions, the ball 24 would rest in the bottom of the first chamber 20 and the slide valve 42 would be in the upper or open position shown in phantom outline in FIG. 2. Should a break occur in the outlet conduit 16 downstream of the first housing section 12 the resistance to flow within the piping system will be suddenly reduced to a minimum. This may happen for example at a point between the valve 10 comprising the present invention and a tanker or a storage tank. Upon a break in the outlet conduit 16, while the resistance to fluid flow decreased rapidly, the velocity of the liquid or gas suddenly increases and the ball 24 is forced against the seat 22 and thereby creates a negative pressure in the outlet conduit 16. However, the pressure in the inlet conduit 18 and the chamber 20 would remain constant and thereby provides a pressure differential. There would also be a pressure differential between the first and second ends 44 and 46 respectively, of the slide 42.

The lower end 46 of the slide 42 will have the same negative pressure as the outlet conduit 16 because of the connection therebetween by the second passageway 54. The upper face 44 of the slide 42 will be at the same pressure as the inlet conduit 18. The resulting pressure differential between the first and end faces 44 and 46 respectively, of the slide 42 will cause the slide to move downwardly to the solid outline position shown in FIG. 2 and thereby closes off the opening 52. The ball 24 will remain against the seat 22 only as long as there is a pressure differential between the inlet and outlet conduits 16 and 18 respectively. Should it be desirable to shut the pumps down, then the pressure differential would disappear and the ball 24 would drop from the closed position against the valve seat 22 to the lower wall of the first chamber 20. The slide 42 will of course remain in a closed position until it is positively displaced to the open position, either manually or by injecting air under greater pressure through the pipe 58 and the fitting 60 against the lower end face 46 of the slide 42.

The present invention requires no springs, bypass leakage, controls or adjustments. A variable ball chamber may be added that either reduces or increases the rate of flow past the ball before the ball closes against the seat. No exterior means need be used. Tilting the ball chamber from the horizontal would also either increase or decrease the rate of flow necessary to displace the ball. If velocity and pressure are great the axis of the ball chamber could be made vertical with the outlet conduit being positioned on top.

There has been disclosed heretofore the best embodiment of the invention presently contemplated. However, it is to be understood that various changes and modifications may be made thereto without departing from the spirit of the invention.

What I claim as new and desire to secure by Letters Patent is:

1. Valve means for a pressurized fluid, said valve means comprising:

a. a housing formed in two sections which are secured to each other, said housing having a first chamber in one of said sections, a second chamber in the other one of said sections in flow communication with said first chamber, and a valve seat formed in said first chamber;

b. an inlet conduit in fluid flow communication with said second chamber, an outlet conduit in fluid flow communication with said first chamber, said inlet conduit being on the other side of said second chamber remote from said valve seat and said outlet conduit being adjacent said valve seat;

c. a first valve member in the form of a ball loosely contained in said first chamber and arranged to engage said valve seat;

d. a second valve member in the form of a slide contained in sealed relationship within said second chamber, said slide including an opening therethrough and first and second end faces, said slide being movable between a first position that blocks the flow of fluid from said inlet conduit to said first chamber and a second position permitting fluid flow from said inlet conduit through said opening in said slide through said second chamber and into said first chamber;

e. first passageway means formed integrally within said housing and in one of said sections thereof for permitting fluid flow from said inlet conduit to said second chamber and against said first end face of said slide to transmit inlet pressure to act against said first end face in a first position direction;

f. second passageway means formed integrally within said housing and in the other one of said sections thereof to communicate said outlet with said second chamber adjacent said second end face of said slide to transmit a lowered outlet pressure to said second end face to effect a first flow blocking position movement of said slide upon a loss of outlet pressure; and g. tube means connected to a source of pressurized air for displacing said slide from said second position thereof to said first position thereof, said tube means being in fluid communication with said second chamber and arranged to direct a flow of pressurized air against said second face of said slide.

* * * * *

UNITED STATES PATENT OFFICE
CERTIFICATE OF CORRECTION

PATENT NO. : 3,949,786
DATED : April 13, 1976
INVENTOR(S) : WILLIAM T. HOUSTON

It is certified that error appears in the above-identified patent and that said Letters Patent are hereby corrected as shown below:

Inventor's Address should read as shown below:

-- Star Route 93B
   Berry Creek, California 95916 --.

Signed and Sealed this twenty-second Day of June 1976

[SEAL]

Attest:

RUTH C. MASON
*Attesting Officer*

C. MARSHALL DANN
*Commissioner of Patents and Trademarks*